United States Patent [19]
Reynolds

[11] Patent Number: 5,809,123
[45] Date of Patent: Sep. 15, 1998

[54] MOTION DETECTION FOR PREVENTING REMOVAL OF A FIXED WIRELESS TERMINAL

[75] Inventor: Kevin T. Reynolds, Plano, Tex.

[73] Assignee: MCI Communications Corporation, Washington, D.C.

[21] Appl. No.: 618,414

[22] Filed: Mar. 15, 1996

[51] Int. Cl.$^6$ .................. H04M 17/00; H04M 11/04; G08B 13/14

[52] U.S. Cl. ................. 379/145; 379/37; 340/568; 340/571; 455/411; 455/425

[58] Field of Search .................. 379/58, 59, 60, 379/61, 143, 145, 155, 37, 397, 45, 49, 51; 340/501, 568, 571, 686, 687, 689; 455/403, 410, 411, 422, 423, 425, 550, 565

[56] References Cited

U.S. PATENT DOCUMENTS

| | | | |
|---|---|---|---|
| 4,608,674 | 8/1986 | Guscott | 340/501 |
| 4,724,538 | 2/1988 | Farrell | 379/59 |
| 4,928,299 | 5/1990 | Tansky et al. | 379/143 |
| 4,954,813 | 9/1990 | August, Sr. et al. | 340/571 |
| 5,406,261 | 4/1995 | Glenn | 340/571 |

Primary Examiner—Paul Loomis

[57] ABSTRACT

Method and apparatus for deterring fraudulent use of a fixed wireless telephone, comprising sensing motion of the telephone with a motion sensor and preventing operation of the telephone after it has been placed in motion and until entry of a security code to reset operation of the telephone. A central facility may also be automatically notified in the event movement of the telephone is detected.

22 Claims, 2 Drawing Sheets

MOTION DETECTION FOR PREVENTING REMOVAL OF A FIXED WIRELESS TERMINAL

FIELD OF THE INVENTION

This invention relates generally to prevention of fraudulent use of a wireless telephone, especially a fixed wireless terminal.

BACKGROUND OF THE INVENTION

Wireless telephone units (WTU's), such as public cellular phones, present a practical and easy solution to the problem of providing telephone service to areas not accessible by current wire based telecommunications. For example, WTU's may be deployed along roadways for emergency use, or may be readily set up in common areas to provide pay telephone service. When a WTU is used in a fixed location, it may be referred to as a fixed wireless telephone unit (FWTU). FWTU's can provide a quick and cost efficient public telephone to any area, particularly remote areas in which there is little or no wireline service.

However, existing FWTU's suffer from the inconvenience that they may be readily abused or misused. For example, although the FWTU is designed for fixed usage, because the FWTU is a wireless unit, it may simply be removed from its mounting and thus become a defacto mobile telephone. Thus, the misuser of a personal FWTU may obtain the benefit of a mobile cellular phone while paying the rates for a stationary fixed phone, which rates are generally less than the rates for mobile phones. Or, a personal or public FWTU may be stolen.

Once in private possession, a stolen FWTU may be altered to provide free unlimited access to the telecommunication network with which the FWTU communicates. As a result, a practical anti-movement, anti-theft, and anti-vandal method and apparatus is needed to deter the fraudulent use of FWTU's. Current technology for protecting the integrity of a telephone relies on the fortification of the telephone to prevent removal. Various materials are used for fortification. However, as a method of resisting telephone abuse, the fortification methods have many disadvantages, including being heavy and hard to install, still subject to theft, and difficult to locate when stolen. Thus, such private and public FWTU's can be relocated to a private location and machined to remove any armour.

A variety of such security features have been used in the past. Examples of such prior art features are described in the patents mentioned below.

U.S. Pat. No. 5,109,412 to Hollowed et al. discloses a public cellular telephone securing apparatus that secures the hand held telephone to its holder. The securing apparatus releases the telephone upon proper activation of the telephone unit, including credit card usage.

U.S. Pat. No. 5,134,654 to McGough discloses a stainless steel shield covering the entirety of the outside face of a public telephone. Operating in conjunction with a securing mounting, the shield provides protection against unauthorized relocation, theft and vandalism.

U.S. Pat. No. 5,283,546 to Scop et al., discloses a vandal-resistant call box that uses a magnetic switch and magnet to determine the position of a handset.

SUMMARY OF THE INVENTION

A principal object of the invention is therefore to provide a method and apparatus for detecting and deterring movement of a FWTU.

Another object of the invention is to provide a method and apparatus for deterring theft and vandalism of FWTU's.

A further object of the invention is to provide a method and apparatus that completely disables a FWTU upon detection of movement because of unauthorized tampering.

Another object of the invention is to provide cost effective and readily available theft and vandalism deterrence.

The present invention, provides a method and apparatus having these and other features for deterrence of theft and vandalism. The FWTU of the invention is provided with a motion detector in electrical connection with the FWTU central controller, so that when the motion detector detects motion disturbing the equilibrium of a mercury switch or equivalent, the FWTU central controller is instructed to completely disable the FWTU. This makes the entire unit inoperative and useless to the tamperer or thief. Operation of the FWTU may be restored by a reset function responsive to entry of a security code with the telephone keys. An important advantage of this invention is that it allows the use of small, light weight FWTU's, which are easier to handle and install than current FWTU's that are made extra heavy to discourage unauthorized movement

BRIEF DESCRIPTION OF THE DRAWINGS

A more complete understanding of the present invention can be obtained by considering the following more detailed description in conjunction with the accompanying drawings, in which.

DETAILED DESCRIPTION OF PREFERRED EMBODIMENTS

The following detailed description of preferred embodiments of the invention is applicable to numerous anti-tampering techniques, as may occur to those of ordinary skill when they learn of this disclosure.

Figure 1:
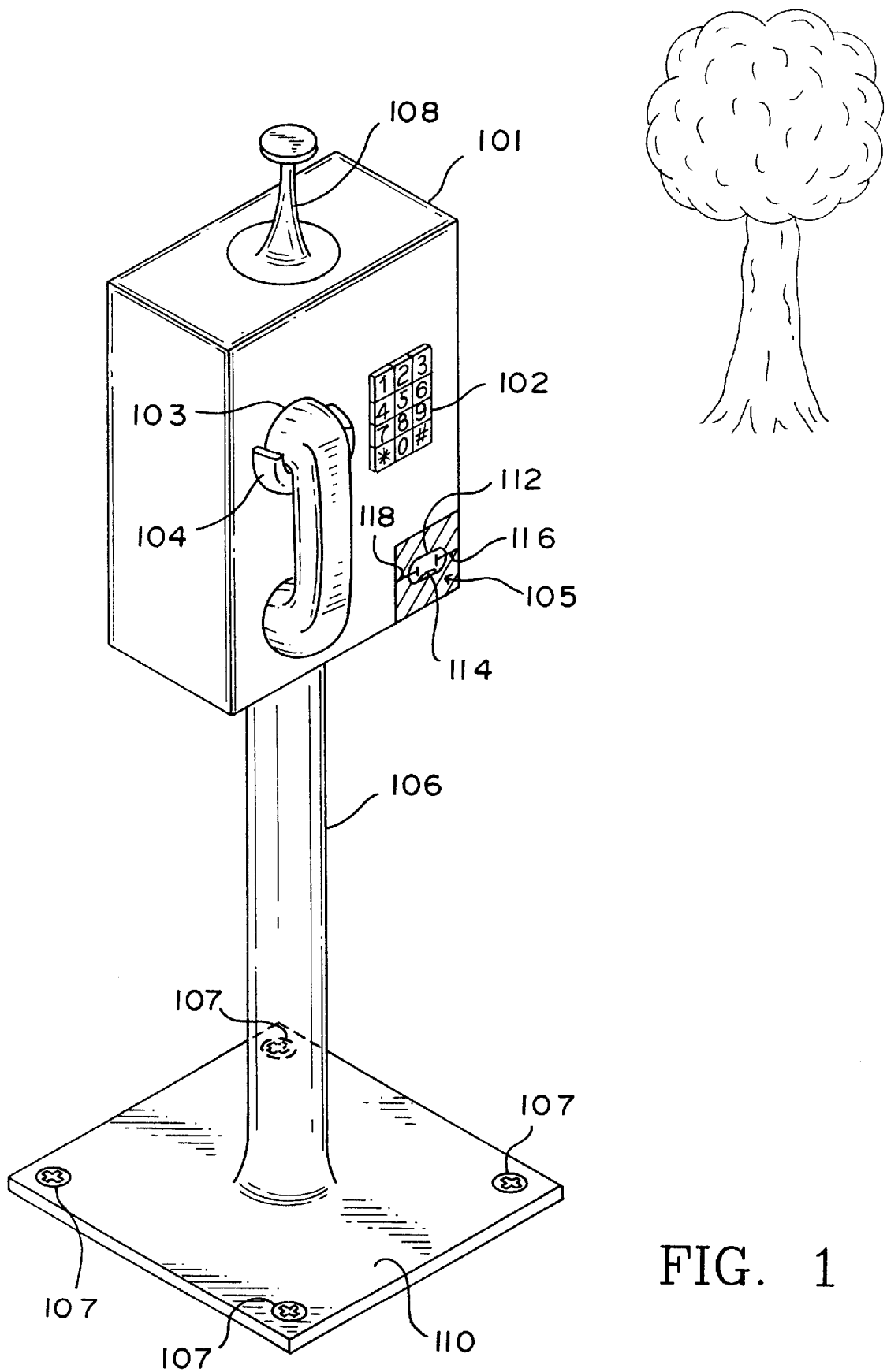
FIG. 1 depicts a public FWTU in accordance with the invention.

FIG. 1 depicts a public FWTU. The FWTU includes a housing 101 secured to a stand 106 which has a base 110 secured to the ground by spikes 107. The FWTU includes an antenna 108 for communication with a cellular network. A phone handset 103 is held within a cradle 104 when not in use, and keypad 102 is used for numeric input into the FWTU. The FWTU includes an internal motion detector 105, which may be a mercury switch, a cantilever beam switch, or a similar device, located within the outer housing 101 to detect any disturbance with the location of the FWTU. In FIG. 1, motion detector 105 is shown as a mercury switch having a bulb 112 containing liquid mercury 114 for connecting electrical contacts 116 and 118 upon any tilting of housing 101, such as would be caused by removal of the housing from its stand 106.

Figure 2:
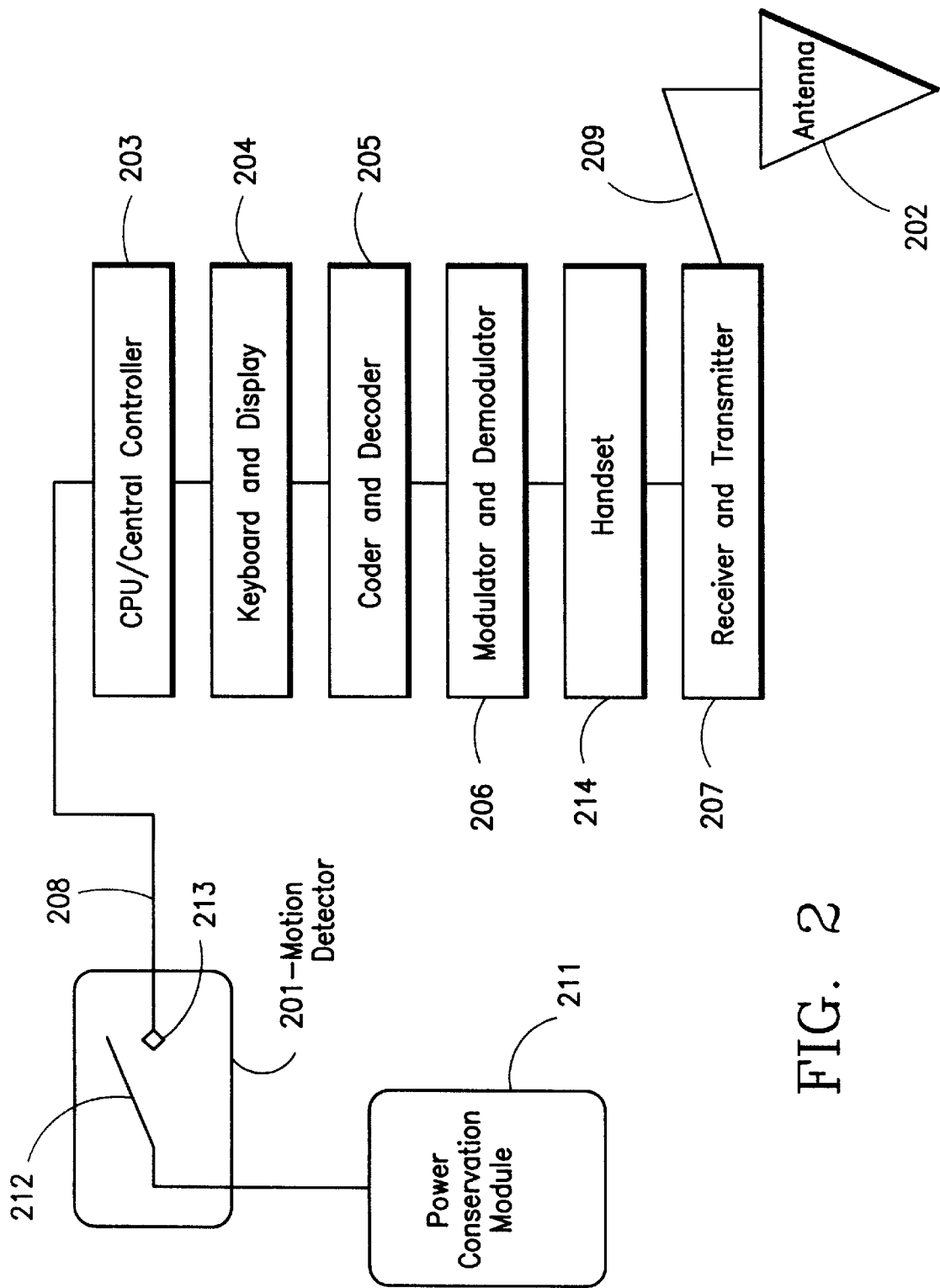
FIG. 2 depicts a flow chart of the operation of a FWTU.

FIG. 2 depicts a schematic diagram of the operation of a FWTU with the motion detector of the invention. In normal operation, the CPU/Central Controller 203 controls operation of the internal workings of the FWTU and its electrically connected components, which include a Keyboard and Display 204 for the input and output of information to the CPU 203, a voice Coder and Decoder 205, a Modulator and Demodulator 206, a Handset 214 for generating voice signals, and a Receiver and Transmitter 207 in electrical connection 209 with Antenna 202 for transmitting and receiving telephone communications. The Keyboard and Display 204 is preferably located on the exterior of the FWTU's housing so that its keyboard component may serve the same functions as keypad 102 of FIG. 1.

When tampering is detected by closure of the switch of motion detector 201, a reset function signal is sent via connection 208 to CPU 203 to cause its microprocessor to reset its operating sequence to a stage requiring further input, thereby disabling the FWTU operation. Motion detection 201 comprises a switch having an electrical connection 212 shown disconnected from a contact 213. When connection 212 is connected with contact 213, the reset signal is allowed to flow to CPU 203. Before CPU 203 resets its microprocessor, the reset signal may be compared with a predetermined noise threshold to determine that the FWTU has been moved.

AC to DC power conversion and DC power can be supplied to motion detector 201 by a power conservation module 211. As an alternative to a special power module, motion detector 201 can be attached to a main or back up battery power supply to effect disabling. In an alternative embodiment, the motion detection switch can be located so as to interrupt the normal power supply to the CPU, thereby causing it to be reset to the beginning of its boot sequence and to subsequently reach a stage requiring further input.

As a further alternative, the status of the motion detector switch may be polled periodically by a detection program and the microprocessor reset by software commands when switch closure is detected. This alternative may provide motion detection that is more difficult to avoid by a person attempting to misuse the terminal by disconnecting the motion detector, because the detection program and polling circuitry could recognize such an unauthorized disconnection.

In the event normal operation of the FWTU is interrupted by the reset function, the invention further includes in the preferred embodiment a restoration capability. In order to restore normal operation, authorized personnel may input an authorization code through the usual keypad 102, or through the keyboard 204 for the CPU 203.

Where the removal is authorized, such as for maintenance of the unit, an access code for overriding the reset function may be entered through the keypad 102 or the keyboard 204. To provide this override capability, the FWTU is programmed to ignore the reset signal after entry of the access code so that a reset command is not generated by the CPU when the mercury switch is moved. To enhance security, reprogramming of the FWTU with an override command sequence can be required each time the power is interrupted to make infeasible improper usage of the access code.

In case of an unauthorized removal, or if entry of an improper authorization or access code is attempted, the FWTU may be programmed to initiate a telephone call to a central facility in order to send an alarm signal indicating theft of the telephone or the attempt to gain unauthorized access. The FWTU may also continue to periodically send the alarm signal for use as a homing signal to help locate the wireless telephone in the event of its unauthorized removal.

While this invention had been described in conjunction with specific embodiments thereof, it is evident that many alternatives, modifications and variations will be apparent to those skilled in the art after they learn of the invention. Accordingly, the preferred embodiments of the invention set forth herein are intended to be illustrative, not limiting. Various changes may be made without departing from the spirit and scope of the invention as defined in the claims set forth below.

What is claimed is:

1. A wireless telephone comprising a housing adapted for stationary usage and a device for preventing operation of the telephone in the event said housing is moved, said preventing device comprising:
   a motion sensor attached to said housing for generating a movement signal indicating movement of said housing; and,
   a microprocessor system for preventing operation of the telephone in response to said movement signal, and comprising software for causing said microprocessor system to be reset in response to said movement signal to an operating stage requiring further input, such that the telephone is disabled until said microprocessor system receives said further input.

2. The wireless telephone according to claim 1, wherein the motion sensor comprises at least one of a mercury switch and a cantilever switch.

3. The wireless telephone according to claim 1, wherein said motion sensor is arranged to interrupt power and said software is such that said power interruption causes said microprocessor system to be reset to said operating stage requiring further input.

4. The wireless telephone according to claim 1 further comprising a transmitter responsive to an output of said microprocessor system for alerting a central facility of telephone housing movement.

5. The wireless telephone according to claim 4, wherein said software includes a program for periodically sending an alarm signal to said central facility while said telephone is disabled such that said alarm signal may be used as a homing signal for locating said moved housing.

6. The wireless telephone according to claim 1, wherein said software causes said movement signal to be ignored after entry of an access code so that said microprocessor system is not reset by subsequent movement of said housing.

7. The wireless telephone according to claim 1, wherein said microprocessor system is arranged to detect disconnection of said motion sensor, and wherein said software includes a detection program for resetting said microprocessor system to said operating stage requiring further input upon detection of said disconnection.

8. A wireless telephone comprising a housing adapted for stationary usage and a device for inhibiting unauthorized movement of the wireless telephone, said inhibiting device comprising:
   a motion sensor attached to said housing for generating a motion signal indicative of mobility of said wireless telephone; and,
   a microprocessor system for preventing operation of the telephone in response to said motion signal;
   said microprocessor system comprising software for causing said microprocessor system to be reset in response to said motion signal to an operating stage requiring further input such that the telephone is disabled until said microprocessor system receives said further input, an input component for entering an authorization code indicating authorized operation of said wireless telephone, and a component for restoring operation of the telephone upon receipt of said authorization code.

9. The wireless telephone according to claim 8, wherein the motion sensor comprises at least one of a mercury switch and a cantilever switch.

10. The wireless telephone according to claim 8 further comprising a transmitter responsive to an output of said microprocessor system for alerting a central facility of telephone housing movement.

11. The wireless telephone according to claim 10, wherein said software includes a program for periodically sending an alarm signal to said central facility while said telephone is disabled such that said alarm signal may be used as a homing signal for locating said moved housing.

12. The wireless telephone according to claim 8, wherein said motion sensor is arranged to interrupt power and said software is such that said power interruption causes said microprocessor system to be reset to said operating stage requiring further input.

13. The wireless telephone according to claim 8, wherein said software causes said motion signal to be ignored after entry of an access code so that said microprocessor system is not reset by subsequent movement of said housing.

14. The wireless telephone according to claim 8, wherein said microprocessor system is arranged to detect disconnection of said motion sensor, and wherein said software includes a detection program for resetting said microprocessor system to said operating stage requiring further input upon detection of said disconnection.

15. A method of preventing operation of a wireless telephone having a housing upon movement of the housing, said housing being adapted for stationary usage, and said method comprising steps of:

receiving a signal from a motion sensor attached to the housing of the wireless telephone;

comparing said signal with a threshold to determine that the telephone housing has moved; and, preventing operation of the telephone upon a determination of telephone housing movement;

said preventing step being performed by a microprocessor system comprising software for causing said microprocessor system to be reset in response to said determination to an operating stage requiring further input, such that the telephone is disabled until said microprocessor system receives said further input.

16. The method according to claim 15, wherein the motion sensor comprises at least one of a mercury switch and a cantilever switch.

17. The method according to claim 15, wherein said signal is provided by interrupting a power supply to a central processing unit of said microprocessor system, said interruption causing said microprocessor system to be reset to said operating stage requiring further input.

18. The method according to claim 15 further comprising periodically polling said motion sensor with said microprocessor system in accordance with a detection program to determine if said motion detector has been disconnected, and resetting said microprocessor system to said operating stage requiring further input upon detection of said disconnection.

19. A method of inhibiting unauthorized movement of a wireless telephone comprising steps of:

attaching a motion sensor to a housing of the wireless telephone;

electrically connecting the motion sensor with a microprocessor system of the wireless telephone so that a signal from the motion sensor is detected by the microprocessor system; and, preventing operation of the wireless telephone after said detection of the signal from the motion sensor;

said preventing step being performed by a microprocessor system comprising software for causing said microprocessor system to be reset in response to said detection to an operating stage requiring further input, such that the telephone is disabled until said microprocessor system receives said further input.

20. The method according to claim 19, wherein the motion sensor comprises at least one of a mercury switch and a cantilever switch.

21. The method according to claim 19, wherein said signal is provided by interrupting a power supply to a central processing unit of said microprocessor system, said interruption causing said microprocessor system to be reset to said operating stage requiring further input.

22. The method according to claim 19 further comprising periodically polling said motion sensor with said microprocessor system in accordance with a detection program to determine if said motion detector has been disconnected, and resetting said microprocessor system to said operating stage requiring further input upon detection of said disconnection.

* * * * *